(12) United States Patent
Grovenburg

(10) Patent No.: US 7,257,087 B2
(45) Date of Patent: Aug. 14, 2007

(54) SYSTEM AND METHOD TO CALCULATE ROUND TRIP DELAY FOR REAL TIME PROTOCOL PACKET STREAMS

(75) Inventor: William Grant Grovenburg, Monument, CO (US)

(73) Assignee: Agilent Technologies, Inc., Santa Clara, CA (US)

( * ) Notice: Subject to any disclaimer, the term of this patent is extended or adjusted under 35 U.S.C. 154(b) by 1141 days.

(21) Appl. No.: 10/263,783

(22) Filed: Oct. 4, 2002

(65) Prior Publication Data

US 2004/0066775 A1  Apr. 8, 2004

(51) Int. Cl.
*H04L 12/26* (2006.01)
(52) U.S. Cl. .................. 370/248; 370/249; 370/252
(58) Field of Classification Search ............. 370/248, 370/249, 252, 254, 255
See application file for complete search history.

(56) References Cited

U.S. PATENT DOCUMENTS 6,212,171 B1 * 4/2001 LaFollette et al. .......... 370/257
7,111,073 B1 * 9/2006 Jain et al. .................. 709/241
7,123,589 B1 * 10/2006 Dawes et al. ............... 370/248

OTHER PUBLICATIONS

H. Schulzrinne et al. Network Working Group Request for Comments: 1889 Category: Standards Track, Audio Video Transport Working Group, Jan. 1996, A Transport Protocol for Real-Time Applications, pp. 1-75.

* cited by examiner

*Primary Examiner*—Melvin Marcelo

(57) ABSTRACT

An apparatus and method calculate a round-trip delay (RTD) between first and second endpoints within a network, where an intermediate point is selected between the first and second endpoints within the network. A network analyzer determines a first data transmission time from the intermediate point to the first endpoint and back to the intermediate point, determines a second data transmission time from the intermediate point to the second endpoint and back to the intermediate point, and adds the first and second data transmission times to determine therefrom the round trip delay between the first and second endpoints within the network.

18 Claims, 6 Drawing Sheets

FIG. 1

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|V=2|P|   RC    |   PT=SR=200   |             length            | header
+-+-+-+-+-+-+-+-+-+-+-+-+-+-+-+-+-+-+-+-+-+-+-+-+-+-+-+-+-+-+-+-+
|                         SSRC of sender                        |
+=+=+=+=+=+=+=+=+=+=+=+=+=+=+=+=+=+=+=+=+=+=+=+=+=+=+=+=+=+=+=+=+
|              NTP timestamp, most significant word             | sender
+-+-+-+-+-+-+-+-+-+-+-+-+-+-+-+-+-+-+-+-+-+-+-+-+-+-+-+-+-+-+-+-+ info
|             NTP timestamp, least significant word             |
+-+-+-+-+-+-+-+-+-+-+-+-+-+-+-+-+-+-+-+-+-+-+-+-+-+-+-+-+-+-+-+-+
|                         RTP timestamp                         |
+-+-+-+-+-+-+-+-+-+-+-+-+-+-+-+-+-+-+-+-+-+-+-+-+-+-+-+-+-+-+-+-+
|                     sender's packet count                     |
+-+-+-+-+-+-+-+-+-+-+-+-+-+-+-+-+-+-+-+-+-+-+-+-+-+-+-+-+-+-+-+-+
|                      sender's octet count                     |
+=+=+=+=+=+=+=+=+=+=+=+=+=+=+=+=+=+=+=+=+=+=+=+=+=+=+=+=+=+=+=+=+
|                 SSRC_1 (SSRC of first source)                 | report
+-+-+-+-+-+-+-+-+-+-+-+-+-+-+-+-+-+-+-+-+-+-+-+-+-+-+-+-+-+-+-+-+ block
| fraction lost |       cumulative number of packets lost       |   1
-+-+-+-+-+-+-+-+-+-+-+-+-+-+-+-+-+-+-+-+-+-+-+-+-+-+-+-+-+-+-+-+
|             extended highest sequence number received         |
+-+-+-+-+-+-+-+-+-+-+-+-+-+-+-+-+-+-+-+-+-+-+-+-+-+-+-+-+-+-+-+-+
|                       interarrival jitter                     |
+-+-+-+-+-+-+-+-+-+-+-+-+-+-+-+-+-+-+-+-+-+-+-+-+-+-+-+-+-+-+-+-+
|                         last SR (LSR)                         |
+-+-+-+-+-+-+-+-+-+-+-+-+-+-+-+-+-+-+-+-+-+-+-+-+-+-+-+-+-+-+-+-+
|                   delay since last SR (DLSR)                  |
+=+=+=+=+=+=+=+=+=+=+=+=+=+=+=+=+=+=+=+=+=+=+=+=+=+=+=+=+=+=+=+=+
|                 SSRC_2 (SSRC of second source)                | report
+-+-+-+-+-+-+-+-+-+-+-+-+-+-+-+-+-+-+-+-+-+-+-+-+-+-+-+-+-+-+-+-+ block
:                               ...                             :   2
+=+=+=+=+=+=+=+=+=+=+=+=+=+=+=+=+=+=+=+=+=+=+=+=+=+=+=+=+=+=+=+=+
|                     profile-specific extensions               |
+-+-+-+-+-+-+-+-+-+-+-+-+-+-+-+-+-+-+-+-+-+-+-+-+-+-+-+-+-+-+-+-+
```

SYSTEM AND METHOD TO CALCULATE ROUND TRIP DELAY FOR REAL TIME PROTOCOL PACKET STREAMS

BACKGROUND OF THE INVENTION

A real-time protocol (RTP) provides end-to-end network transport functions suitable for applications transmitting real-time data, such as audio, video or simulation data, over multicast or unicast network services. An RTP stream includes RTP data packets, which includes encoded audio or video information, and a control protocol (RTCP control packets), which carry control information. The RTP stream does not address resource reservation and does not guarantee quality-of-service for real-time services. The data transport is augmented by the RTCP control packets to allow monitoring of the data delivery in a manner scalable to large multicast networks, and to provide minimal control and identification functionality.

The RTP and RTCP data packets are designed to be independent of the underlying transport and network layers. However, the RTP stream itself does not provide any mechanism to ensure timely delivery or provide other quality-of-service guarantees, does not guarantee delivery or prevent out-of-order delivery, nor does the RTP stream assume that an underlying network is reliable and delivers packets in sequence. An increase in the amount of delay between the time when a message signal is sent out and when the message is transmitted back is objectionable as this delay creates, for instance, echo of the message.

A telephone base station provides communication services between telephone users, land or mobile telephones. A method that can be used to estimate a delay introduced by a network involves a use of time stamps in an Internet Control Message Protocol (ICMP). A message is time stamped with an "Originate Time stamp" and sent by a local user to a far-end user. The message, upon arrival at the far-end user, is time-stamped with a "Receive Time stamp" representing a time, with respect to a timing reference, that the message was received at the far-end user. A difference between the "Originate Time stamp" and the "Receive Time stamp" represents a network delay from the local user to the far-end user. The same message is then returned from the far-end user to the local user with a "Transmit Time stamp" indicating a time, with respect to a timing reference, that the message was transmitted from the far-end user. A difference between the time the message is received at the local user and the time indicated by the "Transmit Time stamp" represents a network delay from the far-end user to the local user.

Another method to determine the network delay uses a round trip delay (RTD), which uses a prescribed message transmitted from the local user to the phone and measures the time it takes to complete a round-trip for the prescribed message to return back to the local user. However, in this case, radio waves of the message are subjected to various microwave obstructions, such as buildings, thus the RTD inherently includes a delay resulting from reflection by such obstructions. This type of delay degrades the accuracy of locating an exact position of a mobile phone and degrades message transmission in real time. Furthermore, for the methods described above and for other existing methods to determine RTD, the determination of the RTD must be made at endpoints of the network where the local user and the far-end user are connected.

SUMMARY OF THE INVENTION

Various objects and advantages of the invention will be set forth in part in the description that follows and, in part, will be obvious from the description, or may be learned by practice of the invention.

To achieve the above and other objects, the present invention provides an apparatus to calculate a round-trip delay (RTD) between first and second endpoints within a network, where an intermediate point is selected between the first and second endpoints within the network, the apparatus including: a network analyzer determining a first data transmission time from the intermediate point to the first endpoint and back to the intermediate point, determining a second data transmission time from the intermediate point to the second endpoint and back to the intermediate point, and adding the first and second data transmission times to determine therefrom the round trip delay between the first and second endpoints within the network.

To achieve the above and other objects, the present invention further provides a method to calculate a round-trip delay (RTD) between first and second endpoints within a network, including: selecting an intermediate point between the first and second endpoints within the network; determining a first data transmission time from the intermediate point to the first endpoint and back to the intermediate point; determining a second data transmission time from the intermediate point to the second endpoint and back to the intermediate point; and adding the first and second data transmission times to determine therefrom the round trip delay between the first and second endpoints within the network.

To achieve the above and other objects, the present invention further provides a method of a network analyzer connected at a point of analysis (RTD) within a network between a source and a receiver, including: outputting a first signal from the source to the receiver; time stamping the first signal as Time1 at the RTD; receiving the first signal at the receiver; outputting a second signal from the receiver to the source; determining a first DLSR indicative of a delay between a time the receiver receives the first signal and a time the receiver outputs the second signal; time stamping the second signal as Time2 at the POA; receiving the second signal at the source; and determining a first delay as follows: First delay=Time2−Time1−first DLSR.

These together with other aspects and advantages which will be subsequently apparent, reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

The above and other objects, features and other advantages of the present invention will be more clearly understood from the following detailed description taken in conjunction with the accompanying drawings, in which:

FIG. 1 is a diagram illustrating a sender report RTCP packet;

DETAILED DESCRIPTION OF THE PREFERRED EMBODIMENTS

Hereinafter, embodiments of the present invention will be described in detail with reference to the attached drawings. The present invention may, however, be embodied in many different forms and should not be construed as being limited to the embodiments set forth herein; rather, these embodiments are provided so that the present disclosure will be thorough and complete, and will fully convey the concept of the invention to those skilled in the art.

RTP has header fields that are either fixed or deterministically varying, with a certain format. These fields include fields for a sequence number, time stamp, synchronization source identifiers, and contributing source identifiers. The header fields can be extended with RTP header extension to provide new payload-format-independent functions that require additional information to be carried in an RTP data packet header. Additionally, RTCP packets have a packet format and header fields for control information. The RTCP header includes timing information and a sequence number that allows a far-end telephone receiver (i.e., receiver) to reconstruct the timing produced by a local telephone source (i.e., source). FIG. 1 illustrates a sender report RTCP packet showing header, sender information, report block 1, and report block 2.

Contained in each RTCP sender report packet is an NTP time stamp having 64 bits indicating a network time stamp indicative of when a message is sent from the source. Once the receiver receives the message including the NTP time stamp, the receiver holds onto the message for a predetermined period of time. The receiver sends a next scheduled RTCP packet, which includes an NTP time stamp indicative of when the message is sent back.

In addition, the RTCP packet includes a last sender report time stamp (LSR) identifier, which identifies the middle 32 bits out of the 64 bits in the NTP time stamp received as part of a most recent RTCP packet received. Further, a delay since last sender report (DLSR) identifier is a delay, expressed in units of 1/65536 seconds, between receiving the message by the receiver and sending back the message to the source (i.e., the period of time the receiver held onto the message).

In essence, the source outputs the message including a first RTCP packet to the receiver. The receiver then sends back the message including a second RTCP packet to the source. To obtain a round-trip time of the message transmitted between the sender and the receiver, the DLSR and a time it took the message to go from the source to the receiver, and back to the source are considered. Contrary to present systems where a telecommunications, cable, or Internet service provider must connect a telephony network analyzer to process the round-trip time to monitor data delivery at the source or the receiver, that is, at end points of the telephone network, the present system allows the provider to connect the telephony network analyzer anywhere within the network.

Figure 2:
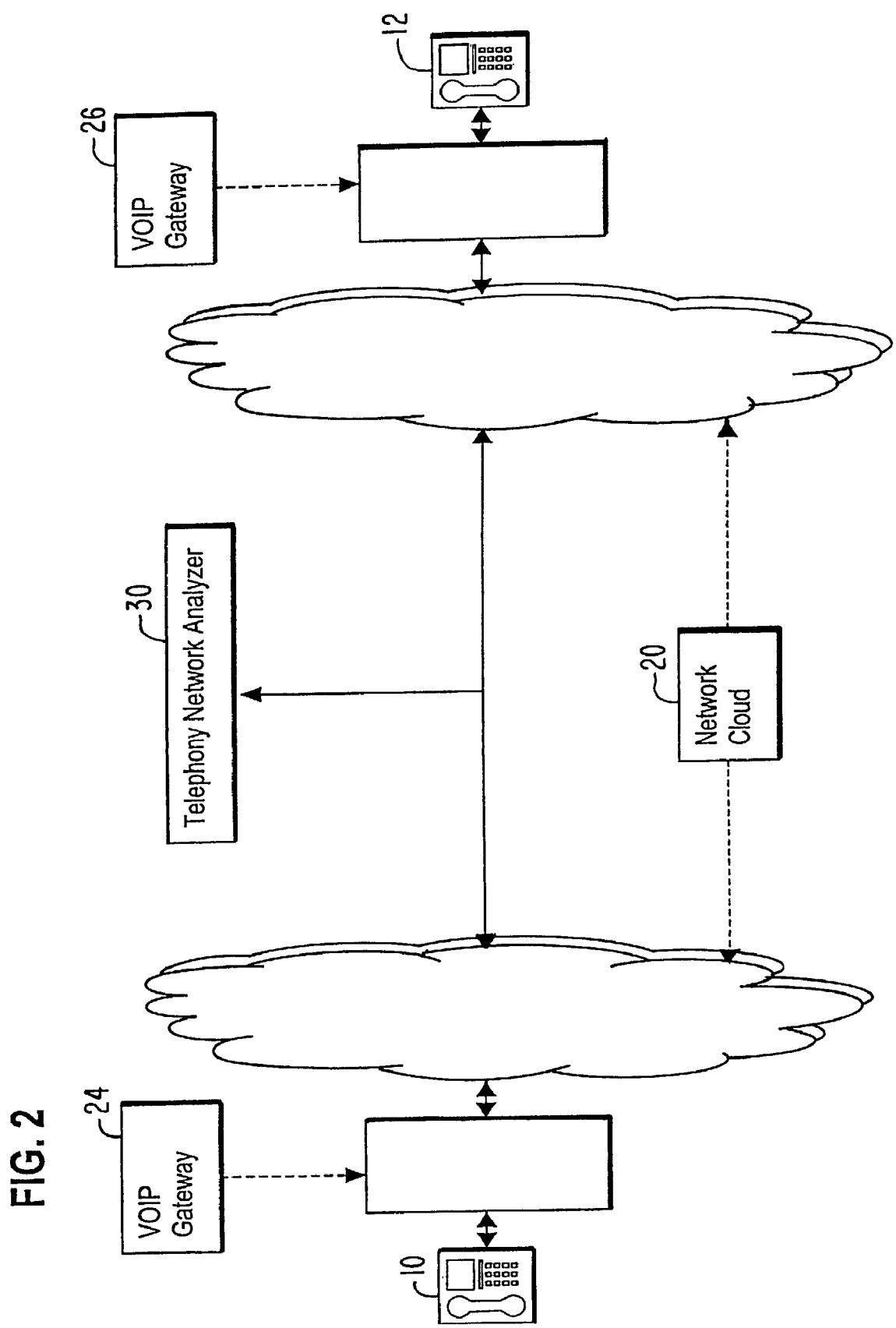
FIG. 2 is a diagram illustrating a configuration of a telecommunications system, which calculates a round trip delay for a round trip delay (RTD) in accordance with the present invention.

FIG. 2 illustrates a configuration of a telecommunications system, which calculates a round trip delay for the RTP in accordance with an embodiment of the present invention. A calling telephone 10 (i.e., source) and a receiving telephone 12 (i.e., receiver) access a telecommunications network 20 through VOIP (Voice Over Internet Protocol) gateways 24, 26. In the alternative, the telecommunications network 20 may be a variable delay network such as LAN/WAN or other IP network. The VOIP gateways 24, 26 route calls between the source 10 and the receiver 12 over the network 20 using Internet Protocol and perform RTP jitter buffering and encapsulation of audio, or video, frames using the RTP packet. A telephony network analyzer 30, such as "J6844A Telephony Network Analyzer" of AGILENT TECHNOLOGIES, Inc. of Andover, Mass., may be connected within the network 20 to monitor the IP traffic (e.g., RTP data) between the source 10 and the receiver 12. The telephony network analyzer 30 also includes permanent or removable storage, such as magnetic and optical discs, RAM, ROM, etc. on which the process or method and data structures of the present invention can be stored and distributed. Though there is shown one telecommunications network 20, there may be more than one.

A feature of the RTP packet format, in accordance with an embodiment of the present invention, is an incorporation of a 16-bit sequence number field in the packet header. This field is used by the source 10 and the receiver 12 to detect lost or out of-order packet arrivals, as well as to identify whether the messages send to the receiver 12 and back to the source 10 are the same, respectively. RTP packets can be of variable length, usually determined by the application. Once the receiver 12 receives a data message from the source, identifiers, such as the LSR identifier, in the RTCP SR/RR packet of the RTP stream associated with the message are checked to confirm order packet arrival.

According to the present invention, in order to determine the round-trip delay, the present configuration allows the system to be hooked up anywhere in the network between the source 10 and the receiver 12 to accurately determine the round-trip delay. Current systems require that the network analyzer determining the round-trip delay be connected to a network endpoint to which the source 10 or the receiver 12 is directly connected, thereby determining the round-trip delay between at the source 10 and at the receiver 12. However, the present invention allows the telephony network analyzer to be connected anywhere within the network. Thus, a service person, for instance, connecting the analyzer to determine the round-trip delay has the flexibility to connect the network analyzer incorporating the system of the present invention at any location within the network.

Figure 3:
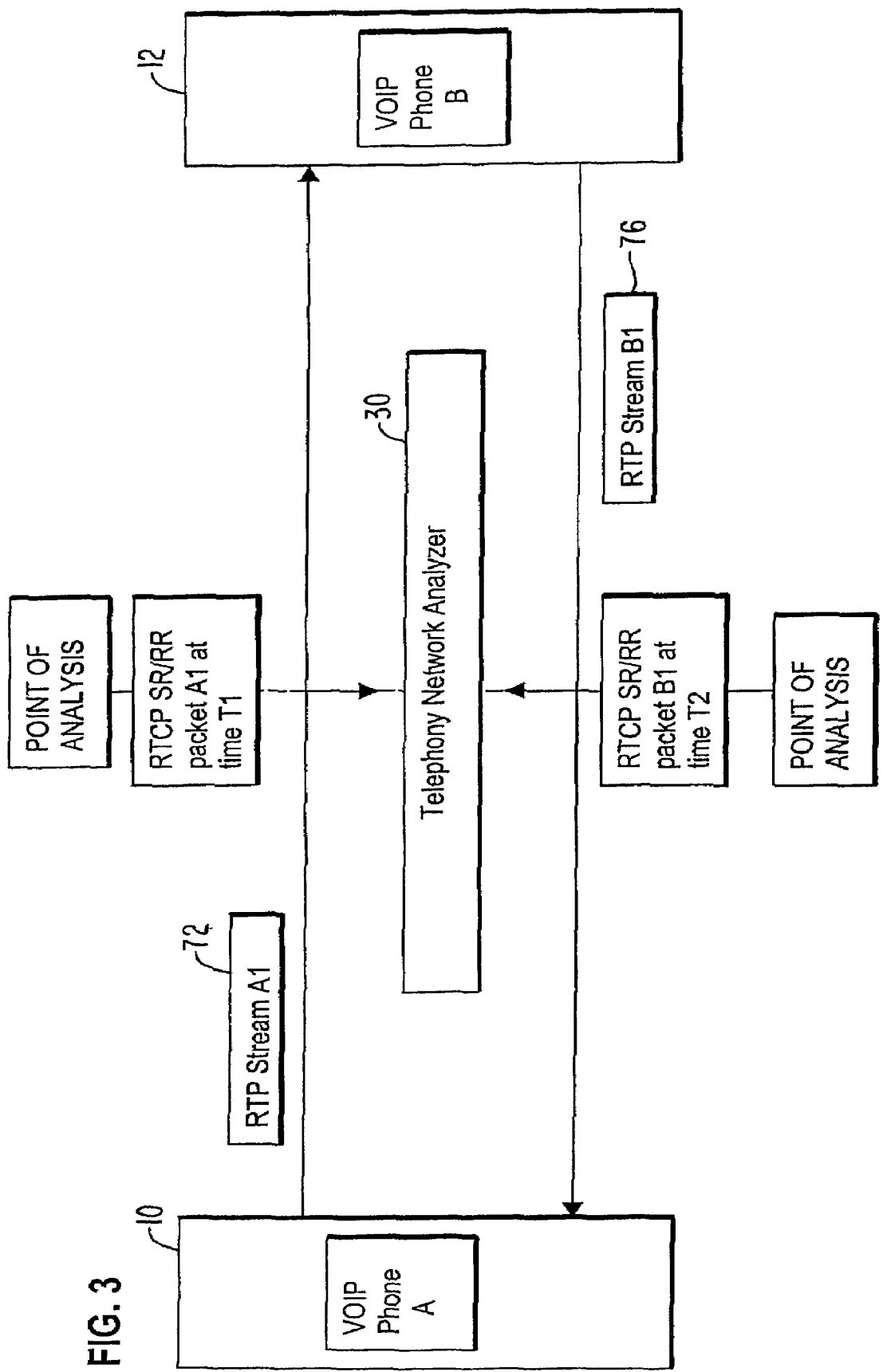
FIG. 3 is a diagram illustrating a system to calculate the RTD between a source and a receiver, in accordance with an embodiment of the present invention.

FIG. 3 is a diagram illustrating a system to calculate the RTD between the source 10 and the receiver 20, in accordance with an embodiment of the present invention. A Point of Analysis (POA) refers to a point within a network where the telephony network analyzer 30 is connected to calculate the round trip delay for the packets in the RTP stream, in accordance with an embodiment of the present invention. As shown in FIG. 3, from the source 10, an RTCP SR/RR packet A1 is sent as a part of an RTP stream A1 72 and output to the receiver 12. At time T1, the RTCP SR/RR packet A1 passes the POA. Subsequently, the receiver 12 receives RTP stream A1 72 including an RTCP SR/RR packet A1 and holds the packet for a predetermined period of time. The receiver 12 then sends out a next RTCP SR/RR packet B1, as part of RTP stream B1 76, back to the source 10. At time T2, the RTCP SR/RR packet B1 passes the POA. The source 10 receives the RTP stream B1 76 including the RTCP SR/RR packet B1 and holds the packet for a predetermined period of time.

Figure 4:
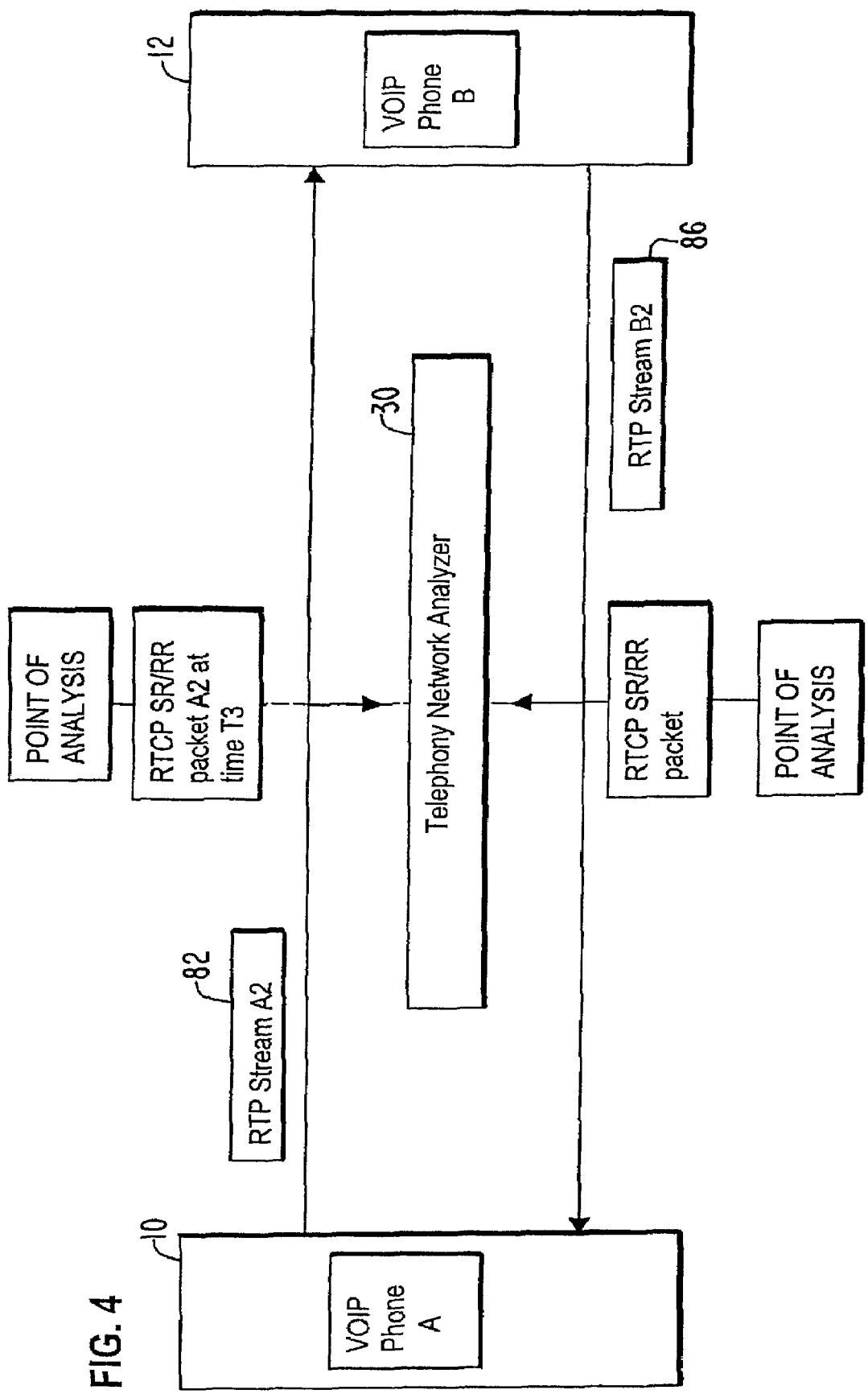
FIG. 4 is a diagram illustrating the system to calculate the RTD between the receiver and the source, in accordance with an embodiment of the present invention.

FIG. 4 is a diagram illustrating a system to calculate the RTP between the receiver 20 and the source 10, in accordance with an embodiment of the present invention. Once the RTCP SR/RR packet B1 passes through the POA at time T2, the source 10 receives the RTP stream B1 76 including the RTCP SR/RR packet B1 and holds the packet for a predetermined period of time. Subsequently, the source 10 outputs an RTCP SR/RR packet A2 as a part of an RTP stream A2 82. At time T3, the RTCP SR/RR packet A2 passes the POA and the telephony network analyzer 30 records and stores the RTCP SR/RR packet A2.

Figure 5A:
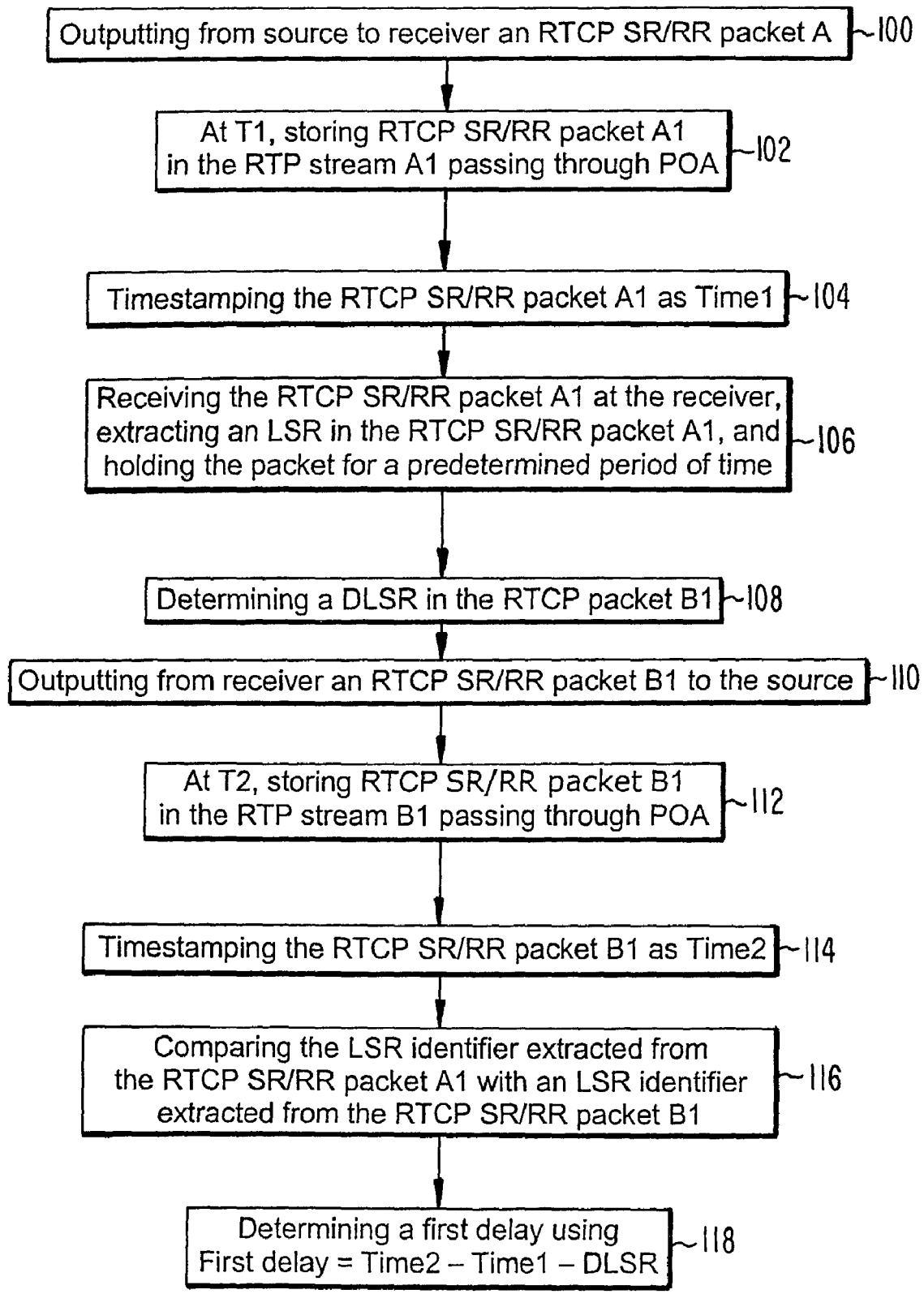
FIGS. 5A and 5B are flowcharts illustrating a method to calculate a total RTD, in accordance with an embodiment of the present invention.

A method to calculate a total RTD will be described hereon with reference to FIG. 5A. At operation 100, from the source 10, an RTP stream A1 72 including an RTCP SR/RR packet A1 is output to the receiver 12. At operation 102, at time T1, the RTCP SR/RR packet A1 passes through the POA and the telephony network analyzer 30 records and stores from the RTP stream A1 72, the RTCP SR/RR packet A1. At operation 104, the telephony network analyzer 30 time stamps the RTCP SR/RR packet A1 as Time T1. The RTCP SR/RR packet A1 includes a 64 bit NTP timestamp, the middle 32 bits which the telephony network analyzer 30 extracts and stores at time T1. At operation 106, the receiver 12 receives the RTP stream A1 72 including an RTCP SR/RR packet A1 and holds the packet for a predetermined period of time. At operation 108, the telephony network analyzer determines a time from receiving the RTP stream A1 72 including the RTCP SR/RR packet A1 to outputting the RTP stream B1 76 including the RTCP SR/RR packet B1 and assigns this value to DLSR in the RTCP SR/RR packet B1, indicative of a delay between the time the receiver 12 receives the RTCP SR/RR packet A1 and the time the receiver 12 outputs the RTCP SR/RR packet B1.

At operation 110, the receiver 12 then sends out the RTP stream B1 76 including the RTCP SR/RR packet B1 to the source 10. The RTCP SR/RR packet B1 also has an LSR identifier, which is the middle 32 bits from the NTP of RTCP SR/RR packet A1. At operation 112, at time T2, the RTCP SR/RR packet B1 passes through the POA and the telephony network analyzer 30 records and stores the RTCP SR/RR packet B1. At operation 114, the telephony network analyzer 30 time stamps the RTCP SR/RR packet B1 as Time2. The RTCP SR/RR packet B1 includes the LSR identifier indicative of the middle 32 bits of the NTP from RTCP SR/RR packet A1, which the telephony network analyzer 30 extracts and stores at time T2. Further, at operation 116, at time T2, the telephony network analyzer 30 compares the LSR identifier extracted from the RTCP SR/RR packet A1 with the LSR identifier extracted from the RTCP SR/RR packet B1 to prevent out-of-order delivery of data between the source 10 and the receiver 12.

At operation 118, the telephony network analyzer 30 determines a first delay by considering the time stamp Time1, that is, the time when the RTCP SR/RR packet A1 passed the POA, the DLSR determined at the receiver 12, and the time stamp Time2, that is, the time when the RTCP SR/RR packet B1 passed the POA. The first delay is represented by the following relationship:

$$\text{First delay} = \text{Time2} - \text{Time1} - DLSR \quad (1)$$

Figure 5B:
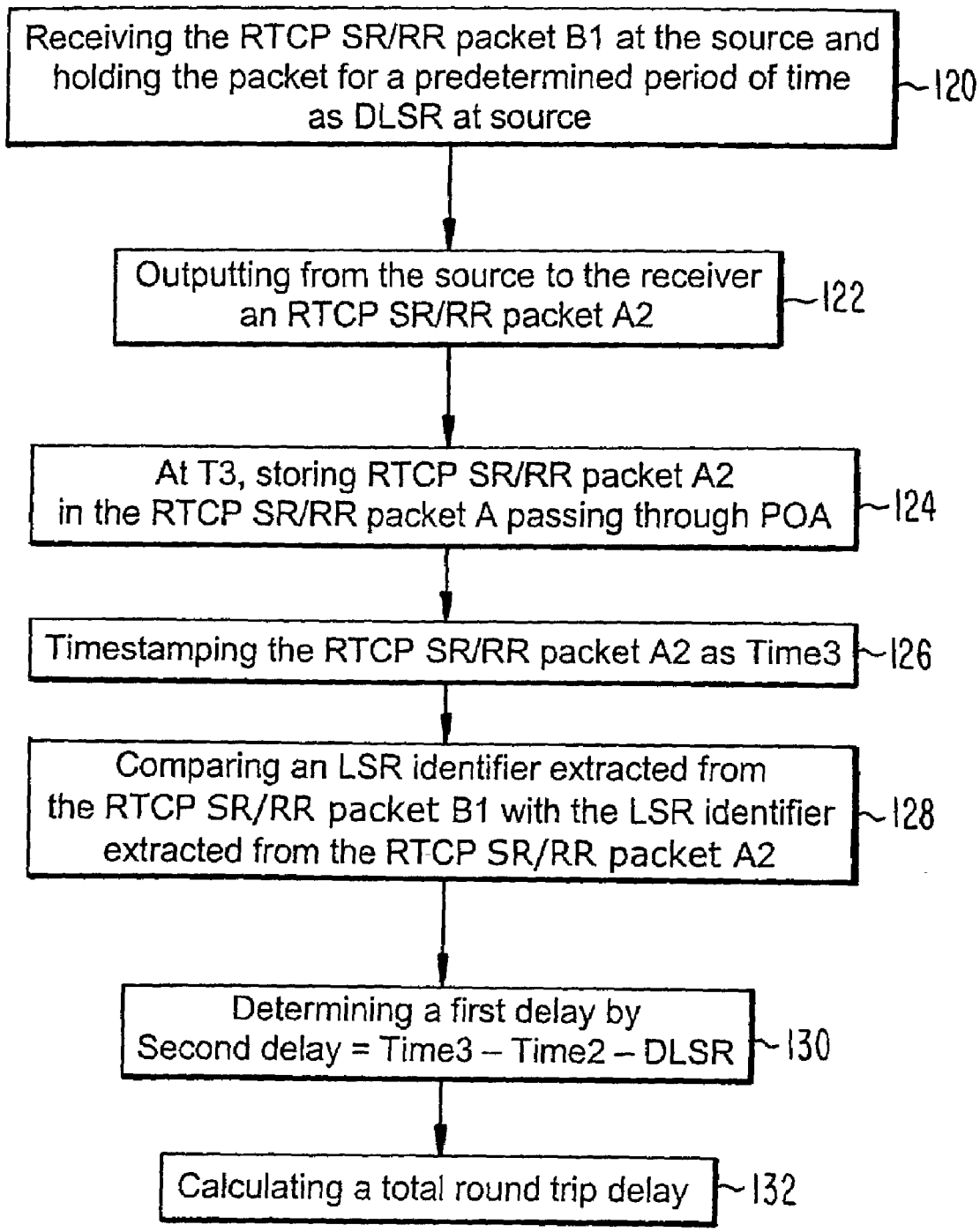

As shown in FIG. 5B, at operation 120, once the RTCP SR/RR packet B1 passes through the POA at time T2, the telephony network analyzer 30 saves the timestamp T2 and the middle 32 bits of the NTP. The source 10 receives the RTCP SR/RR packet B1 and holds the packet for a predetermined period of time. At operation 122, the source 10 outputs the RTP stream A2 82 including the RTCP SR/RR packet A2. At operation 124, at time T3, the RTCP SR/RR packet A2 passes through the POA and the telephony network analyzer 30 records and stores the RTCP SR/RR packet A2. At operation 126, the telephony network analyzer 30 time stamps the RTCP SR/RR packet A2 as Time3. The RTCP SR/RR packet A2 includes an LSR identifier indicative of the middle 32 bits of the NTP timestamp from RTCP SR/RR packet A2, which the telephony network analyzer 30 extracts and stores at time T3. Further, the RTCP SR/RR packet A2 includes a DLSR indicative of a delay between the time the source 10 receives the RTCP SR/RR packet B1 and the time the source 10 outputs the RTCP SR/RR packet A2. Further, at operation 128, at time T3, the telephony network analyzer 30 compares the LSR identifier extracted from the RTCP SR/RR packet B1 with the LSR identifier extracted from the RTCP SR/RR packet A2 to prevent out-of-order delivery of data between the receiver 12 and the source 10.

At operation 130, the telephony network analyzer 30 determines a second delay by considering the time stamp Time3, that is, the time when the RTCP SR/RR packet A2 passed the POA, the DLSR determined at the source 10, and the time stamp Time2, that is, the time when the RTCP SR/RR packet B1 passed the POA. The first delay is represented by the following relationship:

$$\text{Second delay} = \text{Time3} - \text{Time2} - DLSR \quad (2)$$

Subsequently, at operation 132, a total round trip delay is calculated using the following relationship:

$$\text{Total Round Trip Delay} = \text{First delay} + \text{Second delay} \quad (3)$$

In addition the telephony network analyzer 30 may compare the first delay between the POA and the receiver 12 with the second delay between the POA and the source 10 and output a compared result indicative thereof. The service engineer, for instance, may use the compared result to determine a location where the delay is originating. For instance, if the first delay were greater than the second delay, the service engineer would determine that some point between the POA, that is the point where the telephony network analyzer 30 is connected, and the receiver 12 is creating a problem by producing a large delay. The service engineer may subsequently connect the telephony network analyzer 30 closer to the receiver 12 to once again determine a total round trip delay to ultimately locate that point within the network producing the large delay. Further, one of the many advantages of the method of the present invention is that the method does not require the receiver 12 to be synchronized to a common clock with the source 10.

The present invention has been described with respect to a system and method to calculate a round trip delay between first and second endpoints within a network. An intermediate point is selected between the first and second endpoints. A first data transmission time is determined from the intermediate point to the first endpoint and back to the intermediate point; and a second data transmission time is determined from the intermediate point to the second endpoint and back to the intermediate point. The first and second data transmission times are added to determine therefrom the round trip delay between the first and second endpoints within the network.

The system implementing the method described above includes permanent or removable storage, such as an application specific integrated circuit (ASIC), magnetic and optical discs, RAM, ROM, etc. on which the process and data structures of the present invention can be stored and distributed. The processes can also be distributed via, for example, downloading over a network such as the Internet.

The many features and advantages of the invention are apparent from the detailed specification and, thus, it is intended by the appended claims to cover all such features and advantages of the invention that fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

What is claimed is:

1. An apparatus to calculate a round-trip delay (RTD) between first and second endpoints within a network, where an intermediate point is selected between the first and second endpoints within the network, the apparatus comprising:

a network analyzer determining a first data transmission time from the intermediate point to the first endpoint and back to the intermediate point, determining a second data transmission time from the intermediate point to the second endpoint and back to the intermediate point, and adding the first and second data transmission times to determine therefrom the round trip delay between the first and second endpoints within the network, wherein the first endpoint outputs a first signal, the network analyzer time stamps the first signal as Time1 at the intermediate point, and the second endpoint receives the first signal and outputs a second signal.

2. The apparatus as recited in claim 1, wherein the network analyzer determines a first DLSR indicative of a delay between a time the second endpoint receives the first signal and a time the second endpoint outputs the second signal and time stamps the second signal as Time2 at the intermediate point.

3. The apparatus as recited in claim 2, wherein the first endpoint receives the second signal and the network analyzer subtracts the Time1 and the first DLSR from the Time2 to determine therefrom the first data transmission time.

4. The apparatus as recited in claim 3, wherein the first endpoint outputs a third signal to the second endpoint, and the network analyzer determines a second DLSR indicative of a delay between a time the first endpoint receives the second signal and a time the first endpoint outputs the third signal, time stamps the third signal as Time3 at the intermediate point, and subtracts the Time2 and the second DLSR from the Time3 to determine therefrom the second data transmission time.

5. The apparatus as recited in claim 1, wherein, at the intermediate point, the network analyzer extracts an LSR identifier from the first signal indicative of middle 32 bits of the first signal, extracts and LSR identifier from the second signal indicative of middle 32 bits of the second signal, and compares the LSR identifier of the first signal with the LSR identifier of the second signal to prevent out-of-order delivery of data between the source and the receiver.

6. The apparatus as recited in claim 4, wherein, at the intermediate point, the network analyzer extracts an LSR identifier from the third signal indicative of middle 32 bits of the third signal, and compares the LSR identifier of the second signal with the LSR identifier of the third signal to prevent out-of-order delivery of data between the receiver and the source.

7. The apparatus as recited in claim 1, wherein the first endpoint is not synchronized to a common clock with the second endpoint.

8. A method to calculate a round-trip delay (RTD) between first and second endpoints within a network, comprising:

selecting an intermediate point between the first and second endpoints within the network;

determining a first data transmission time from the intermediate point to the first endpoint and back to the intermediate point;

determining a second data transmission time from the intermediate point to the second endpoint and back to the intermediate point; and adding the first and second data transmission times to determine therefrom the round-trip delay between the first and second endpoints within the network, wherein the determining of the first data transmission time comprises:

outputting a first signal from the first endpoint;

time stamping the first signal as Time1 at the intermediate point;

receiving the first signal at the second endpoint;

outputting a second signal from the second endpoint to the first endpoint;

determining a first DLSR indicative of a delay between a time the second endpoint receives the first signal and a time the second endpoint outputs the second signal;

time stamping the second signal as Time2 at the intermediate point;

receiving the second signal at the first endpoint; and subtracting the Time1 and the first DLSR from the Time2 to determine therefrom the first data transmission time.

9. The method as recited in claim 8, wherein the determining of the second data transmission time comprises:

outputting a third signal from the first endpoint to the second endpoint;

determining a second DLSR indicative of a delay between a time the first endpoint receives the second signal and a time the first endpoint outputs the third signal;

time stamping the third signal as Time3 at the intermediate point; and subtracting the Time2 and the second DLSR from the Time3 to determine therefrom the second data transmission time.

10. The method as recited in claim 8, further comprising:

extracting the LSR identifier from the first signal, at the intermediate point, indicative of middle 32 bits of the first signal;

extracting an LSR identifier from the second signal, at the intermediate point, indicative of middle 32 bits of the second signal; and comparing, at the intermediate point, the LSR identifier of the first signal with the LSR identifier of the second signal to prevent out-of-order delivery of data between the source and the receiver.

11. The method as recited in claim 9, further comprising:

extracting an LSR identifier from the third signal, at the intermediate point, indicative of middle 32 bits of the third signal; and comparing, at the intermediate point, the LSR identifier of the second signal with the LSR identifier of the third signal to prevent out-of-order delivery of data between the receiver and the source.

12. The method as recited in claim 8, wherein the first endpoint is not synchronized to a common clock with the second endpoint.

13. A method of a network analyzer connected at a point of analysis (POA) within a network between a source and a receiver, comprising:
- outputting a first signal from the source to the receiver;
- time stamping the first signal as Time1 at the POA;
- receiving the first signal at the receiver;
- outputting a second signal from the receiver to the source;
- determining a first DLSR indicative of a delay between a time the receiver receives the first signal and a time the receiver outputs the second signal;
- time stamping the second signal as Time2 at the POA;
- receiving the second signal at the source; and
- determining a first delay as follows:

First delay=Time2−Time1−first DLSR.

14. The method as recited in claim 13, further comprising:
- outputting a third signal from the source to the receiver;
- determining a second DLSR indicative of a delay between a time the source receives the second signal and a time the source outputs the third signal;
- time stamping the third signal as Time3 at the POA; and
- determining a second delay as follows:

Second delay=Time3−Time2−second DLSR.

15. The method as recited in claim 14, further comprising:
calculating a total round trip delay using a following relationship:

Total Round Trip Delay=First delay+Second delay.

16. The method as recited in claim 13, further comprising:
- extracting an LSR identifier from the first signal, at the POA, indicative of middle 32 bits of the first signal;
- extracting an LSR identifier from the second signal, at the POA, indicative of middle 32 bits of the second signal; and
- comparing, at the POA, the LSR identifier of the first signal with the LSR identifier of the second signal to prevent out-of-order delivery of data between the source and the receiver.

17. The method as recited in claim 14, further comprising:
- extracting an LSR identifier from the third signal, at the POA, indicative of middle 32 bits of the third signal; and
- comparing, at the POA, the LSR identifier of the second signal with the LSR identifier of the third signal to prevent out-of-order delivery of data between the receiver and the source.

18. The method as recited in claim 13,
wherein the receiver is not synchronized to a common clock with the source.

* * * * *

UNITED STATES PATENT AND TRADEMARK OFFICE
CERTIFICATE OF CORRECTION

PATENT NO.       : 7,257,087 B2                                       Page 1 of 1
APPLICATION NO.  : 10/263783
DATED            : August 14, 2007
INVENTOR(S)      : Grovenburg It is certified that error appears in the above-identified patent and that said Letters Patent is hereby corrected as shown below:

On the Title page, in Item (56), under "Other Publications", in column 2, line 1, delete "Netw ork" and insert -- Network --, therefor.

On the Title page, in Item (56), under "Other Publications", in column 2, line 2, delete "Audio Video" and insert -- Audio-Video --, therefor.

Signed and Sealed this

Eighteenth Day of December, 2007

JON W. DUDAS
*Director of the United States Patent and Trademark Office*

UNITED STATES PATENT AND TRADEMARK OFFICE
CERTIFICATE OF CORRECTION

PATENT NO. : 7,257,087 B2
APPLICATION NO. : 10/263783
DATED : August 14, 2007
INVENTOR(S) : Grovenburg Page 1 of 1

It is certified that error appears in the above-identified patent and that said Letters Patent is hereby corrected as shown below:

On the face page, in field (56), under "Other Publications", in column 2, line 1, delete "Netw ork" and insert -- Network --, therefor.

On the face page, in field (56), under "Other Publications", in column 2, line 2, delete "Audio Video" and insert -- Audio-Video --, therefor.

Signed and Sealed this

First Day of January, 2008

JON W. DUDAS
*Director of the United States Patent and Trademark Office*